(12) United States Patent
Hou et al.

(10) Patent No.: US 10,769,253 B2
(45) Date of Patent: Sep. 8, 2020

(54) METHOD AND DEVICE FOR REALIZING VERIFICATION CODE

(71) Applicant: TENCENT TECHNOLOGY (SHENZHEN) COMPANY LIMITED, Shenzhen (CN)

(72) Inventors: Xin Hou, Shenzhen (CN); Zhiwei Niu, Shenzhen (CN); Guosheng Ben, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 262 days.

(21) Appl. No.: 15/636,453

(22) Filed: Jun. 28, 2017

(65) Prior Publication Data
US 2017/0300676 A1 Oct. 19, 2017

Related U.S. Application Data

(63) Continuation of application No. PCT/CN2016/077777, filed on Mar. 30, 2016.

(30) Foreign Application Priority Data

Apr. 16, 2015 (CN) .......................... 2015 1 0180721

(51) Int. Cl.
*H04W 12/12* (2009.01)
*H04W 12/00* (2009.01)
(Continued)

(52) U.S. Cl.
CPC ............ *G06F 21/31* (2013.01); *G06F 21/566* (2013.01); *G09C 1/00* (2013.01);
(Continued)

(58) Field of Classification Search
CPC .. G06F 2221/2133; G06F 19/00; G06F 21/32; G06F 21/36; G06F 21/31;
(Continued)

(56) References Cited

U.S. PATENT DOCUMENTS

2008/0228580 A1* 9/2008 Korman ................. G06Q 30/02
705/14.27
2011/0047138 A1* 2/2011 Dong .................. G06F 17/2795
707/706
(Continued)

FOREIGN PATENT DOCUMENTS

CN 102904722 1/2013
CN 104038502 9/2014
(Continued)

OTHER PUBLICATIONS

International Search Report for International Application No. PCT/CN2016/077777, dated Jul. 4, 2016.

*Primary Examiner* — Alexander Lagor
*Assistant Examiner* — Howard H. Louie
(74) *Attorney, Agent, or Firm* — Brinks Gilson & Lione

(57) ABSTRACT

A method and device for realizing a verification code are provided. In some embodiments, a character verification code is obtained and displayed when it is determined to perform identity verification. The character verification code has an incorrect character based on a priori knowledge. The user is prompted to input a correct character corresponding to the incorrect character in the character verification code. Verification information is received. It is determined that the verification is successful when the verification information corresponds to the correct character of the prior knowledge; otherwise, the verification failed.

15 Claims, 6 Drawing Sheets

(51) Int. Cl.
  *G06F 21/55* (2013.01)
  *G06F 21/31* (2013.01)
  *G09C 1/00* (2006.01)
  *G06F 21/56* (2013.01)
  *H04L 29/06* (2006.01)

(52) U.S. Cl.
  CPC ....... *H04L 29/06877* (2013.01); *H04W 12/00* (2013.01); *H04W 12/12* (2013.01); *H04W 12/1202* (2019.01); *G06F 2221/00* (2013.01); *G06F 2221/21* (2013.01); *G06F 2221/2133* (2013.01)

(58) Field of Classification Search
  CPC .. G06F 21/316; G06F 21/566; G06F 2221/00; G06F 2221/21; G06F 21/55; G09C 1/00; H04W 12/1202; H04W 12/00; H04W 12/12; H04L 29/06877
  See application file for complete search history.

(56) References Cited

U.S. PATENT DOCUMENTS

| | | | | |
|---|---|---|---|---|
| 2013/0132093 A1* | 5/2013 | Gross | ...................... | G10L 15/22 704/273 |
| 2015/0180856 A1* | 6/2015 | Shuster | ................. | H04L 63/126 726/7 |

FOREIGN PATENT DOCUMENTS

| | | | | |
|---|---|---|---|---|
| CN | 104144052 | | 11/2014 | |
| CN | 104283682 | | 1/2015 | |
| WO | WO-2015003599 A1 * | | 1/2015 | ............. G06F 21/36 |

\* cited by examiner

METHOD AND DEVICE FOR REALIZING VERIFICATION CODE

CROSS REFERENCE TO RELATED APPLICATION

The present application is a continuation of International Application No. PCT/CN2016/077777, titled "METHOD AND DEVICE FOR REALIZING VERIFICATION CODE", filed on Mar. 30, 2016, which claims priority to Chinese Patent Application No. 201510180721.X, titled "METHOD AND DEVICE FOR REALIZING VERIFICATION CODE", filed on Apr. 16, 2015 with the State Intellectual Property Office of the People's Republic of China, both of which are incorporated herein by reference in their entirety.

TECHNICAL FIELD

The present disclosure relates to the field of computer technology, and in particular to a method and a device for realizing a verification code.

BACKGROUND

Completely automated public Turing test to tell computers and humans apart (CAPTCHA), also known as verification code technology, is a completely automated public program to determine whether a user is a computer or a person. In a CAPTCHA test, a computer serving as a server automatically generates a question for a user to answer. Since the computer usually can not answer the CAPTCHA question, a user who answers the question may be identified as a human. Using verification codes can efficiently prevent malicious behaviors, such as cracking passwords violently, brushing tickets, and adding water in forums via automated programs.

Presently, the most common verification code is a what-you-see-is-what-you-get verification code. A typical example of the what-you-see-is-what-you-get verification code is a character verification code and a puzzle verification code. Fundamental principles of a conventional character verification code are described below. A server provides an image X, and the image is usually generated automatically by the server according to rules. A user observes the image X, searches for numbers, English characters, or Chinese characters Y in the image, and provides numbers or characters Y understood by the user to the server. The server compares Y inputted by the user with an answer Y' corresponding to the original image X. If Y is consistent with Y', it is determined that the current user is a human user, and if Y is not consistent with Y', it is determined that the current user is a non-human user.

For conventional character verification codes, as long as enough samples are collected and OCR (Optical Character Recognition) technology is used for learning and training, available automaton programs will be soon developed to recognize the conventional character verification codes. To resist recognition of character verification codes by an automaton, a common practice at present is to add various interfaces, such as rotation, distortion, deformation, or interference lines. However, as interfaces added into verification codes become increasingly complex, it is increasingly difficult for a human user to recognize the verification codes with the interfaces, resulting in an increasingly decrease of the recognition accuracy of verification codes.

Therefore, as the artificial intelligence technology, such as deep learning or sparse coding becomes mature, the precision of OCR becomes higher and higher, and the effect of anti-crack for automatons by means of merely image interference is not very efficient. As a result, the recognition accuracy of verification codes continuously decreases and the verification efficiency becomes lower and lower.

To improve user's experience, puzzle verification codes are proposed. A user clicks and rotates a corresponding small picture, and splices the small picture into a corresponding position to distinguish him from an automaton. Compared to conventional character verification codes, puzzle verification codes can bring a good user's experience, but increase the cost, for the puzzle verification codes require a picture library with a large data volume. In addition, the selected picture is basically ten times the size of a conventional character verification code (generally, the size of a conventional character verification code is smaller than 4 KB, and the size of a puzzle verification code is greater than 40 KB). Therefore, either the network transmission rate or the production rate of puzzle verification codes is slower than that of character verification codes. It sometimes takes a long time to get a puzzle verification code for a user on a mobile terminal.

Compared to conventional character verification codes, puzzle verification codes are merely image verification codes, and information, such as a splicing position and a splicing direction can also be recognized by means of image recognition technologies. Therefore, the anti-crack capacity is not high.

SUMMARY

A method and a device for realizing a verification code is provided according to embodiments of the present disclosure, for improving the anti-crack capacity of verification codes and the verification efficiency of the verification codes.

A method for realizing a verification code is provided according to embodiments of the present disclosure, which includes:

obtaining and displaying a character verification code, in a case that it is determined to perform identity verification, where the character verification code includes an incorrect character based on a priori knowledge;

prompting inputting a correct character corresponding to the incorrect character in the verification code, and receiving verification information; and determining that the verification is successful, in a case that the verification information corresponds to the correct character based on a priori knowledge, and determining that the verification failed, in a case that the verification information does not correspond to the correct character based on a priori knowledge.

A verification method is provided according to embodiments of the present disclosure, which includes:

obtaining a character sequence, where the character sequence includes a first part and a second part;

generating a verification code based on the character sequence, where the generated verification code includes a first part and a second part, and the second part of the verification code is different from the second part of the character sequence;

displaying the verification code;

receiving verification information inputted by a user; and comparing the verification information inputted by the user with the second part of the character sequence.

A verification device is provided according to embodiments of the present disclosure, which includes a memory and a processor. The memory stores program codes, that when executed by the processor, configure the device to execute the methods according to embodiments of the present disclosure.

A computer readable storage medium is provided according to embodiments of the present disclosure, which stores program codes. When executed by a processor, the program codes configure the processor to execute the methods according to embodiments of the present disclosure.

It may be seen from the above technical solutions that, the embodiments of the present disclosure have the following advantages. Character verification codes are constructed based on a priori knowledge of humans, and incorrect characters are corrected based on a priori knowledge of humans. Since the character verification codes are used, the production rate and transmission rate of the verification codes are high, a verification code library can be very large, but few resources are occupied. In addition, since a priori knowledge of humans is used, and no image interface is added, the image recognition technology can be resisted. Therefore, the anti-crack capacity is high, and the verification efficiency is high.

BRIEF DESCRIPTION OF THE DRAWINGS

To illustrate technical solutions according to embodiments of the present disclosure more clearly, drawings to be used in the descriptions of the embodiments are described briefly hereinafter. Apparently, the drawings described hereinafter are only for some embodiments of the present disclosure, and other drawings may be obtained by those skilled in the art based on those drawings without creative efforts.

DETAILED DESCRIPTION OF THE EMBODIMENTS

To make the object, the technical solutions and advantages of the present disclosure clearer, hereinafter the present disclosure is further illustrated in detail in conjunction with the drawings. Apparently, the described embodiments are merely a few rather than all of the embodiments of the present disclosure. All other embodiments obtained by those skilled in the art based on the embodiments of the present disclosure without creative efforts shall fall within the protection scope of the present disclosure.

Figure 1:
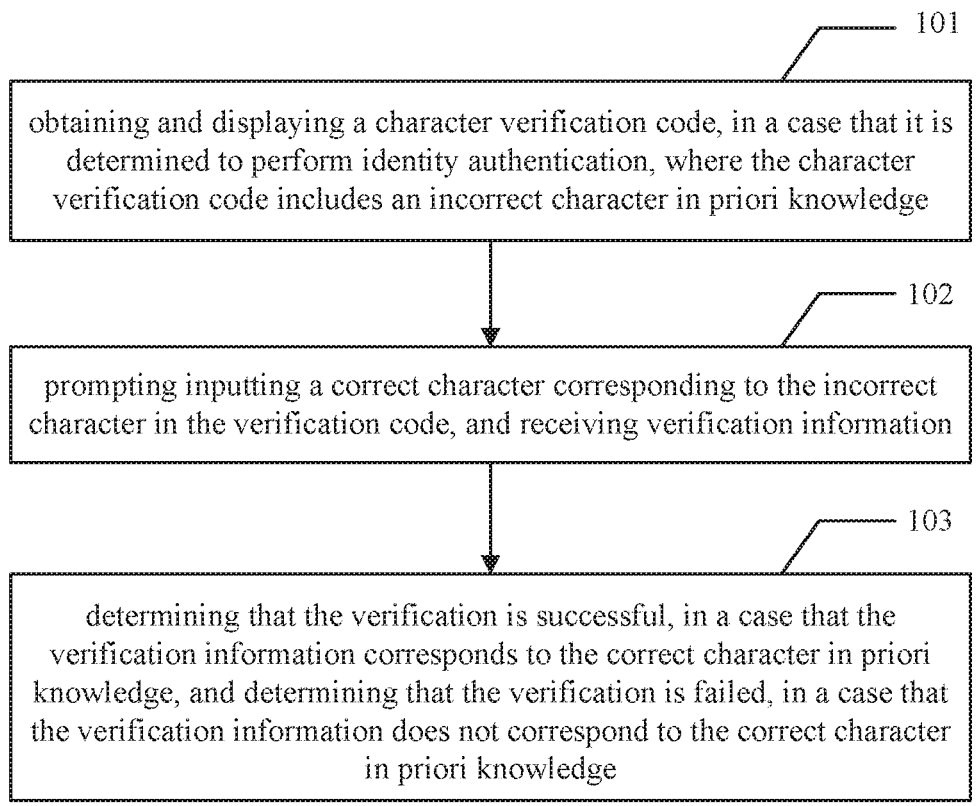
FIG. 1 is a schematic flow chart of a method for realizing a verification code according to an embodiment of the present disclosure.

FIG. 1 illustrates a method for realizing a verification code according to an embodiment of the present disclosure, which includes step 101 to 103.

In step 101, a character verification code is obtained and displayed, in a case that it is determined to perform identity verification. The character verification code includes an incorrect character based on a priori knowledge.

When a user uses a computing device, identity verification is generally required for security. In a case that multiple computing devices are connected over network (for example, one computing device is a terminal, and the other one is a server), an identity verification may be performed on the terminal or the server. The identity verification may include operating authorization verification or login verification. Specific application scenarios may refer to conventional situations where verification codes are used, which are not limited in the embodiments of the present disclosure. With a priori knowledge, humans can automatically correct some simple semantic mistakes. On the basis, a solution for realizing a verification code is provided according to the embodiments of the present disclosure. The character verification code may be provided by a service provider (such as a server), and the service provider then sends the character verification code to a terminal for displaying. Alternatively, the character verification code may be locally generated by a verification executer (such as a terminal), which is described below in detail.

First, specific implementations of generating the verification code by the verification executer are described below.

The character verification code may be obtained by: obtaining a short sentence from a local text, and randomly extracting characters from the short sentence to perform a random transformation, to enable an incorrect character based on a priori knowledge to occur in the short sentence.

Characters in the character verification code may be Chinese characters, English characters, or other characters. Optionally, in the embodiment, the language currently used by the user is first determined, and then the character verification code in the same language is obtained, which enable the user to use a priori knowledge with a high matching rate, thereby, further improving the verification efficiency.

Optionally, in a case that the characters in the character verification code are in Chinese, before performing the random transformation, the method further includes: determining synonym characters of the extracted character in a synonym character library. Then characters other than the synonym characters may be used to perform the random transformation.

There are many synonym characters in Chinese characters. For example, the meaning of Chinese words 忽然 and 突然 are nearly the same in a sentence. Thus it may be difficult for a user to make determination based on a priori knowledge, if 突 is transformed to 忽. Therefore, non-synonym characters are used for the transformation, which can prevent this situation from occurring, thereby, improving the verification success-rate.

Second, specific implementations of providing a verification code by the service provider or a server are described below.

The character verification code may be obtained by receiving the character verification code from the service provider (such as the server). The character verification code is a short sentence, and the short sentence includes an incorrect character based on a priori knowledge.

The method of generating the verification code at the server is the same as that of locally generating the verification code at the verification executer, which is not repeated herein.

Two specific implementations of the verification code are described in the above. According to an exemplary embodiment of the present disclosure, in a case that the character verification code is a set of alphabetic strings, the incorrect character(s) includes at least one of non-beginning and non-ending characters with reversed order in the alphabetic string, missed character(s) in the string, and randomly added character(s) in the string.

Optionally, the incorrect character based on a priori knowledge in the verification code may be prompted, during displaying the verification code. Specifically, the method further includes: displaying prompt information for the incorrect character.

For example, the incorrect character may be highlighted, for example, by colors (such as a color different from the original color) or by marks (such as a frame or being in bold).

In step 102, a correct character corresponding to the incorrect character in the verification code is prompted to be inputted, and verification information is received.

The method for prompting a user to input the correct character is similar to a conventional prompting method of character verification codes except that prompt information is added. The prompt information may inform the user that the original character is incorrect, and to input a correct character, thereby, avoiding the user inputting the original displayed character according to a what-you-see-is-what-you-get method.

In step 103, it is determined that the verification is successful, in a case that the verification information corresponds to the correct character based on a priori knowledge, and it is determined that the verification failed, in a case that the verification information does not correspond to the correct character based on priori knowledge.

The correct character(s) is an original correct character, for example, a corresponding character(s) before operations such as reversing the order of characters, missing characters in a string, or randomly adding a character in a string. The correct character(s) may be saved in a device for generating the verification code (such as a server), and may also be sent to a device for performing identity verification (such as a terminal) after the verification code is generated.

Character verification codes are constructed based on a priori knowledge of humans according to the embodiment of the present disclosure, and incorrect characters are corrected based on a priori knowledge of humans. Since the character verification codes are used, the production rate and transmission rate of the verification codes are high, a verification code library can be very large, but few resources are occupied. In addition, since a priori knowledge of humans is used, and no image interface is added, the image recognition technology can be resisted. Therefore, the anti-crack capacity is high, and the verification efficiency is high.

The character verification codes according to the embodiment of the present disclosure use a priori knowledge of humans. Image recognition targets of an automaton are basically determined in the training by humans, and can at best only recognize deformations in various images, but can not recognize the semantic changes of characters. Let see the following two sentences (the first one being a Chinese sentence including incorrect characters):

"研表究明，汉字的序顺并不定 一能影阅响读，比如当你看完这句话后，才发这现里的字全 是都乱的。"

"Accdrnig to a rscheearch at an Elingsh uinervtisy, it deosn't mttaer in waht oredr the ltteers in a wrod are, the olny iprmoetnt tihng is taht frist and lsat ltteer is at the rghit pclae".

As may be seen from the above two sentences, humans can automatically correct some simple semantic mistakes, based on a priori knowledge. Therefore, with the verification codes according to the embodiments of the present disclosure, some tiny mistakes are created for users to correct. Users can input a correct answer. This type of verification codes brings a good experience to users, and only character pictures need to be produced. Therefore, the production cost is low, and the anti-crack capacity is better than conventional character verification codes.

Figure 2:
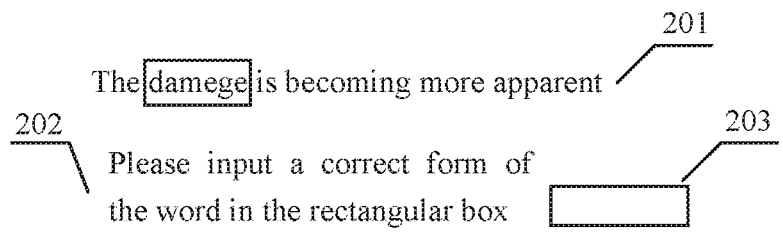
FIG. 2 is a schematic diagram of verifying a verification code according to an embodiment of the present disclosure.

An example of the character verification codes based on a priori knowledge of humans is shown in FIG. 2. Reference number 201 represents a verification code including an incorrect character which is "The damege is becoming more apparent". Reference number 202 represents displayed prompt information "please input a correct form of the word in the rectangular box" to prompt a user to input a correct character(s). Reference number 203 represents an input box to receive the input of the user. If the user inputs "damage" in 203, the verification will be successful.

Figure 3:
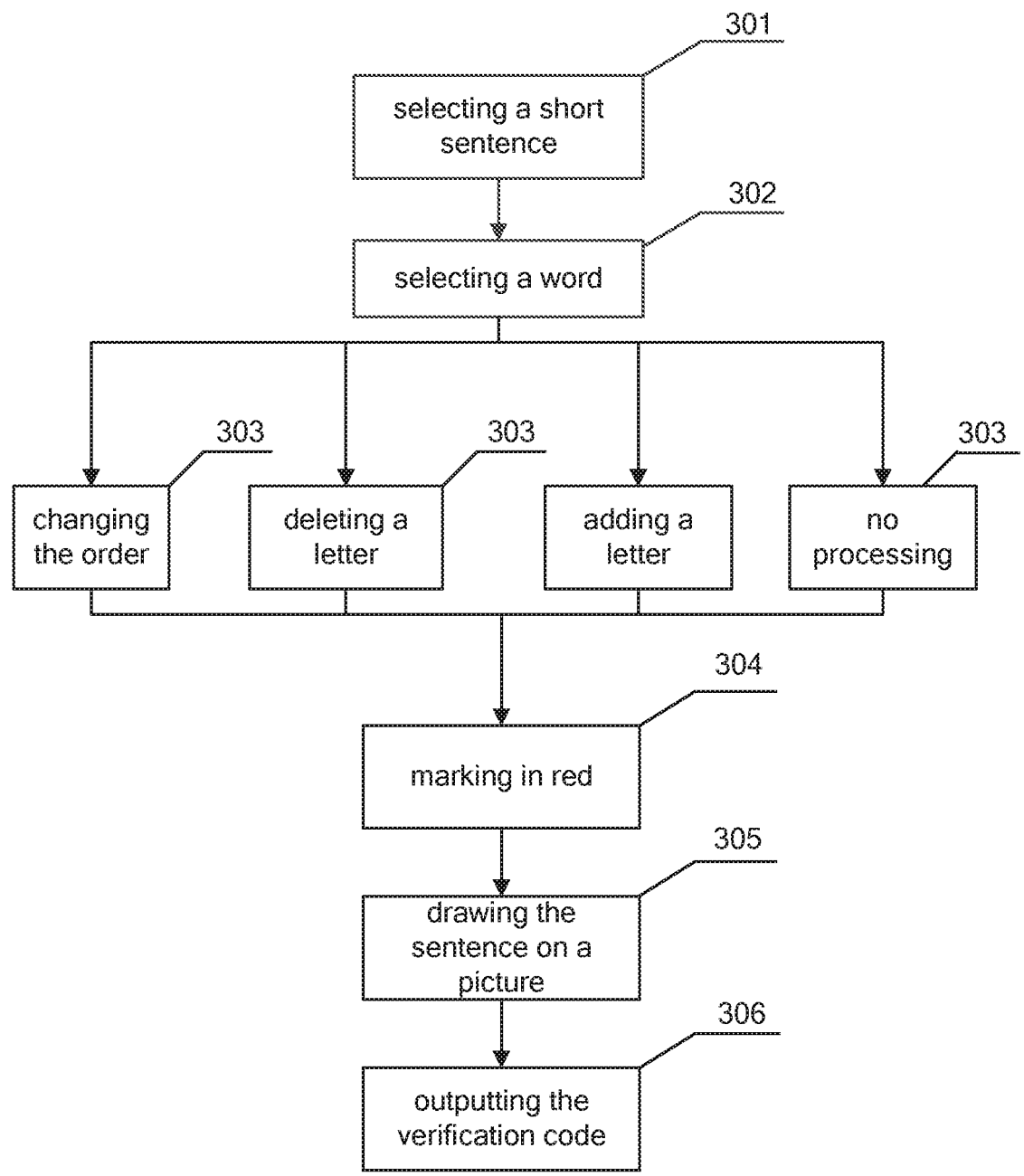
FIG. 3 is a schematic flow chart of a method for generating a verification code according to an embodiment of the present disclosure.

Reference is made to FIG. 3, which illustrates the process of generating an verification code according to an embodiment of the present disclosure, which includes the following steps:

301, randomly selecting a short sentence from a document;

302, randomly selecting a word from the short sentence;

303, performing at least one of the following four operations on the word:

randomly exchanging two letters (optionally, randomly changing the order of two letters which are not the beginning letter and the ending letter);

randomly deleting a letter (optionally, randomly deleting a letter in a middle position);

randomly adding a letter (optionally, randomly adding a letter in a middle position); and no processing.

304, marking the changed word in red;

305, drawing the sentence with the word marked in red on a picture to generate a verification code; and

306, outputting the verification code.

The solutions according to the embodiment of the present disclosure have the following advantages. User's experience is improved, and the verification rate is high, for no image interface is added. The size of the verification code can be ensured to be the same as that of a conventional verification code, solving the problems of a low transmission rate and a low production rate. The anti-crack capacity is high, since a priori knowledge of humans is applied to correct mistakes in the present disclosure, and the image recognition technology can not crack the verification codes according to the present disclosure.

Figure 4:
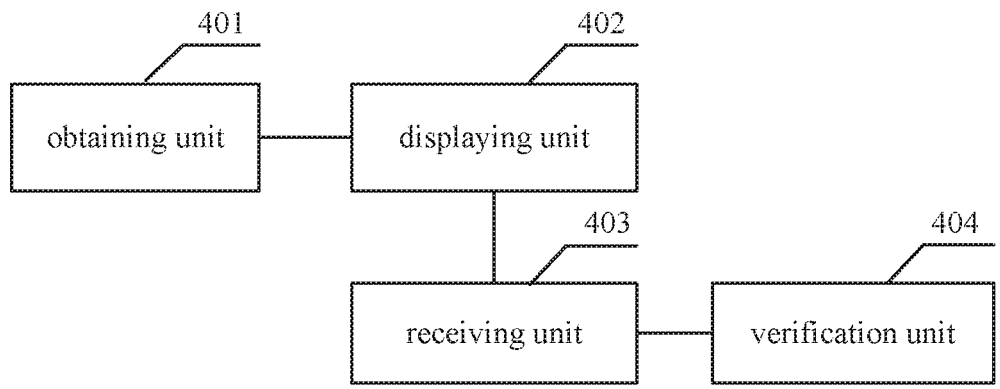
FIG. 4 is a schematic structural diagram of a device for realizing a verification code according to an embodiment of the present disclosure.

A device for realizing a verification code is further provided according to an embodiment of the present disclosure shown in FIG. 4, which includes:

an obtaining unit 401, configured to obtain a character verification code, in a case that it is determined to perform identity verification, where the character verification code includes an incorrect character based on a priori knowledge;

a displaying unit 402, configured to display the character verification code and prompt inputting a correct character corresponding to the incorrect character in the verification code;

a receiving unit 403, configured to receive verification information; and a verification unit 404, configured to determine that the verification is successful, in a case that the verification information corresponds to the correct character based on a priori knowledge, and determine that the verification failed, in a case that the verification information does not correspond to the correct character based on a priori knowledge.

In the embodiment of the present disclosure, identity verification may be performed on the terminal or the server. The identity verification may include operating authorization verification or login verification. Specific application scenarios may refer to conventional situations where verification codes are used, which are not limited in the embodiments of the present disclosure. It should be noted that, if verification codes are provided by a server, the server may send the character verification codes to a terminal for displaying.

The method for prompting a user to input the correct character is similar to a conventional prompting method of character verification codes except that prompt information is added. The prompt information may inform the user that the original character is incorrect, and to input a correct character, thereby, avoiding the user inputting the original displayed character according to a what-you-see-is-what-you-get method.

The correct character(s) is an original correct character, for example, a corresponding character(s) before operations such as reversing the order of characters, missing characters in a string, or randomly adding a character in a string. The correct character(s) may be saved at a device for generating the verification code (such as a server), and may also be sent to a device for performing identity verification (such as a terminal), after the verification code is generated.

Character verification codes are constructed based on a priori knowledge of humans according to the embodiment of the present disclosure, and incorrect characters are corrected based on a priori knowledge of humans. Since the character verification codes are used, the production rate and transmission rate of the verification codes are high, a verification code library can be very large, but few resources are occupied. In addition, since a priori knowledge of humans is used, and no image interface is added, the image recognition technology can be resisted. Therefore, the anti-crack capacity is high, and the verification efficiency is high.

According to the exemplary embodiment of the present disclosure, the character verification codes may be provided by a service provider (such as a server), or locally generated by a verification executer (such as a terminal), which are described below in detail.

First, specific implementations of generating the verification code by the verification executer are described below.

Figure 5:
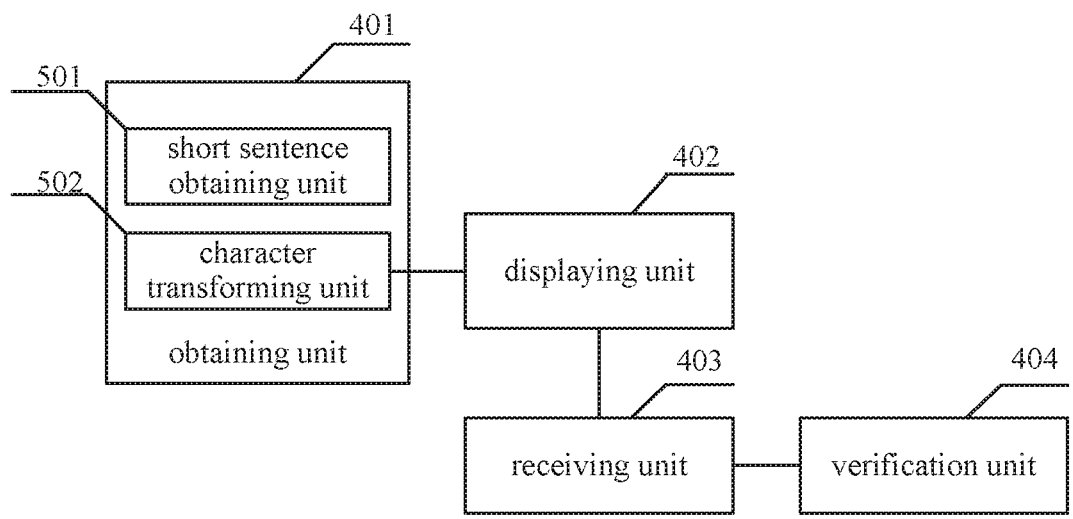
FIG. 5 is a schematic structural diagram of a device for realizing a verification code according to another embodiment of the present disclosure.

Optionally, as shown in FIG. 5, the obtaining unit 401 includes:

a short sentence obtaining unit 501, configured to obtain a short sentence from a local text; and a character transforming unit 502, configured to randomly extract characters from the short sentence to perform a random transformation, to enable an incorrect character based on a priori knowledge to occur in the short sentence.

Figure 6:
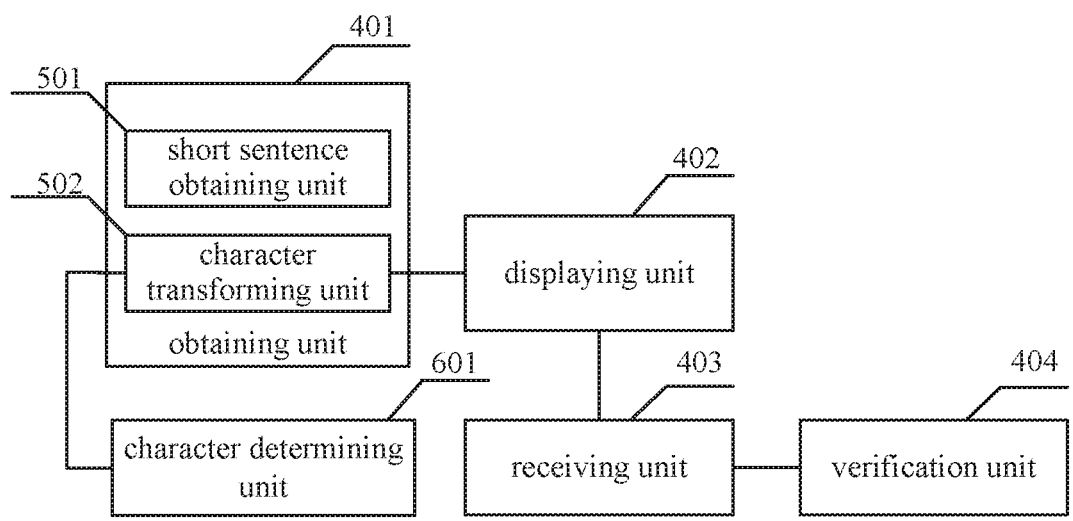
FIG. 6 is a schematic structural diagram of a device for realizing a verification code according to another embodiment of the present disclosure.

Characters in the character verification code may be Chinese characters, English characters, or other characters. Optionally, if the characters in the character verification code are in Chinese, as shown in FIG. 6, the device further includes a character determining unit 601, configured to determine synonym characters of the extracted character in a synonym character library, before the character transforming unit 502 performs the random transformation. The character transforming unit 502 is configured to performing transformation by using characters other than the synonym characters.

Second, specific implementations of providing a verification code by the service provider or a server are described below.

Optionally, the obtaining unit 401 is configured to receive a character verification code from the service provider. The character verification code is a short sentence, and the short sentence includes an incorrect character based on a priori knowledge.

The method of generating the verification code at the server is the same as that of locally generating the verification code at the executer, which is not repeated herein.

Optionally, in a case that the character verification code is a set of alphabetic strings, the incorrect character includes at least one of non-beginning and non-ending characters with reversed order in the alphabetic string, missed character in the string, and randomly added character in the string.

Optionally, the incorrect character based on a priori knowledge in the verification code may be prompted, during displaying the verification code. Specifically, the displaying unit 402 is further configured to display prompt information for the incorrect character.

For example, the incorrect character may be highlighted, for example, by colors (such as a color different from the original color) or by marks (such as a frame or being in bold).

Figure 9:
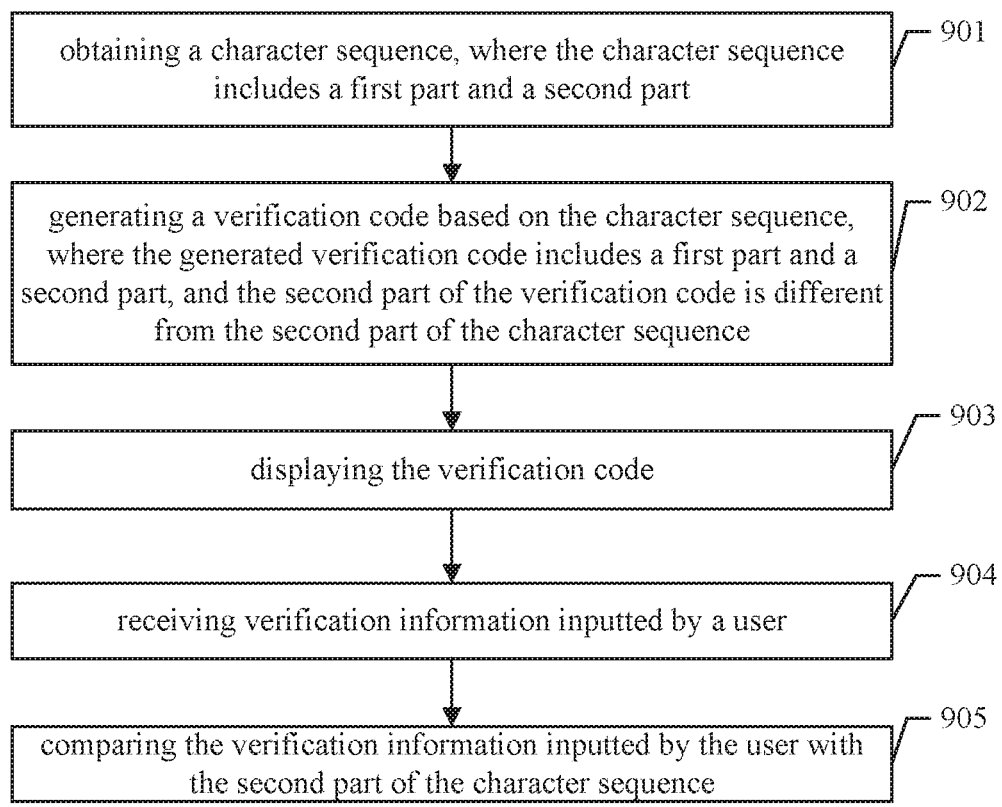
FIG. 9 is a schematic flow chart of a verification method according to an embodiment of the present disclosure.

FIG. 9 is a flow chart of a verification method according to an embodiment of the present disclosure. According to the embodiment of the present disclosure, to verify a user identity, a verification code may be generated by a computing device (or the computing device may receive a verification code generated by another computing device), and a user may perform inputting based on the verification code. The computing device (or the other computing device connected to the computing device) determines whether the input by the user is correct. The verification method according to the embodiment of the present disclosure is described below in detail, referring to FIG. 9, which includes step 901 to 905.

In step 901, a character sequence is obtained, where the character sequence includes a first part and a second part. Each of the first part and the second part of the character sequence may include one or more characters. Characters in the character sequence may be Chinese characters, English characters, characters in other languages, or any combination of those.

Characters in the character sequence may form multiple words. In Chinese, a word is generally composed of several Chinese characters, and in English, a word is generally composed of several letters. Characters in the character sequence form multiple words, and those words may form a sentence, or a phrase to express a relatively complete thought. If those words form a relatively complete thought and one or several words are mistakenly spelled, a user may quickly learn of original correct words and may have a good experience.

The character sequence may be obtained from a text library or a document. For example, the sentence or the phrase may be selected from a document (such as a famous literary work) to form the character sequence.

It may select randomly a part of the character sequence for transformation processing to be described below (for purposes of distinction, this part of the character sequence to be transformed is referred to as the second part of the character sequence, and the other of the character sequence is referred to as the first part of the character sequence). For example, one or multiple words may be selected randomly from the character sequence as the part of the character sequence to be transformed.

In step 902, a verification code is generated based on the character sequence. The generated verification code includes a first part and a second part, and the second part of the verification code is different from the second part of the character sequence.

The first part of the character sequence may remain unchanged, and the second part of the character sequence is processed by transformation to generate a verification code. In such way, the generated verification code includes two parts. The first part of the generated verification code is the same as the first part of the character sequence, and the second part of the character sequence is transformed to obtain the second part of the verification code. The transformation processing on the second part of the character sequence includes at least one of: reversing the order of at least two characters, deleting at least one character, substituting at least one character, or adding at least one character, with respect to the second part of the character sequence. Optionally, in performing the transformation processing, the first character and the last character of the second part of the character sequence are not changed.

In a case that the second part of the character sequence is a English word, in performing the transformation processing, the English word may be mistakenly spelled on purpose, to enable a user to input a correct word when inputting a verification code as described below. Alternatively, the second part of the verification code and the second part of the character sequence are both correct words, but have quite different meaning.

In step 903, the verification code is displayed.

When displaying the verification code, the second part of the verification code may be highlighted, for example, by colors (such as a color different from the original color), or by marks (such as a frame or being in bold).

In step 904, verification information inputted by a user is received.

When displaying the verification code, prompt information may be displayed to prompt the user to input verification information, for example, informing the user that incorrect character(s) is displayed, and please input a correct character.

In step 905, the verification information inputted by the user is compared with the second part of the character sequence.

It is determined that the verification is successful, in a case that the verification information inputted by the user corresponds to the second part of the character sequence, and it is determined that the verification failed, in a case that the verification information inputted by the user does not correspond to the second part of the character sequence.

Figure 7:
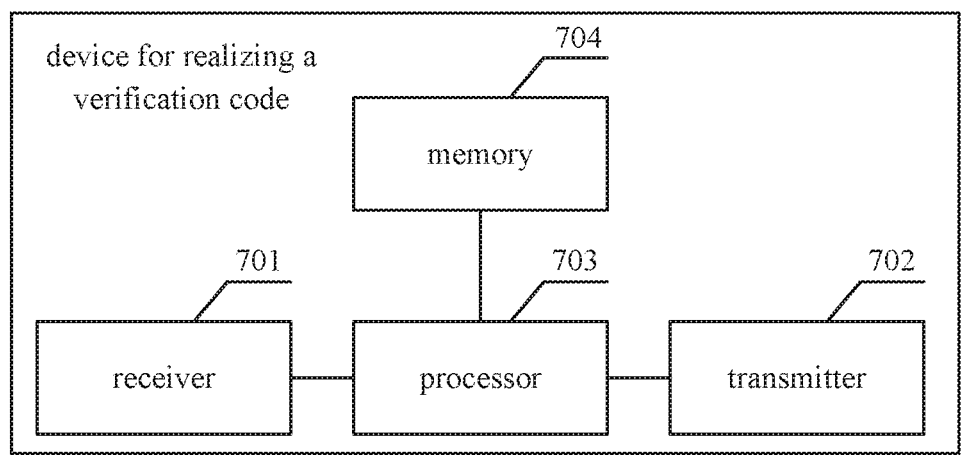
FIG. 7 is a schematic structural diagram of a device for realizing a verification code according to another embodiment of the present disclosure.

Another device for realizing a verification code (i.e. a verification device) is further provided according to an embodiment of the present disclosure, as shown in FIG. 7. It includes a receiver 701, a transmitter 702, a processor 703 and a memory 704. The memory stores program codes that, when executed by the processor, configure the processor (or the device) to execute the methods according to any of the above embodiments.

Figure 8:
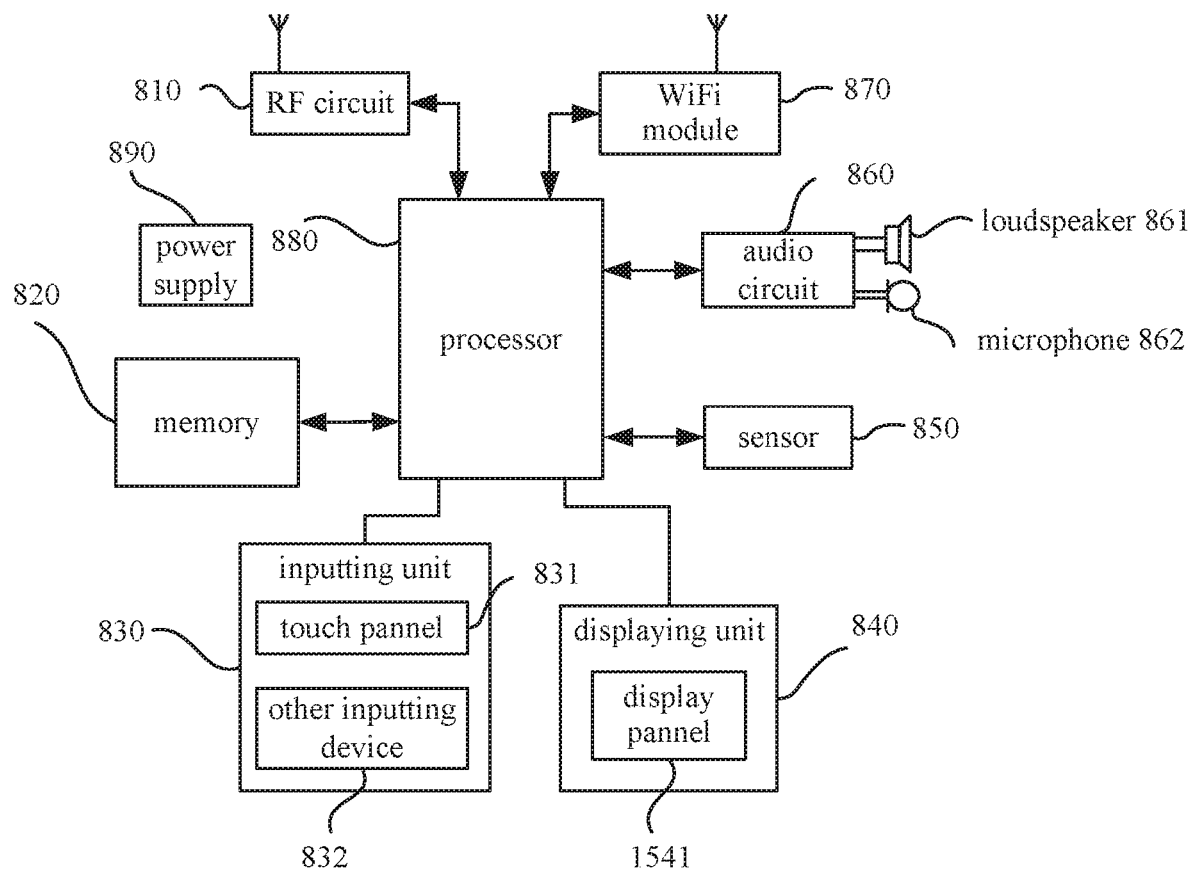
FIG. 8 is a schematic structural diagram of a device for realizing a verification code according to another embodiment of the present disclosure.

Another device for realizing a verification code (i.e. a verification device) is further provided according to an embodiment of the present disclosure, as shown in FIG. 8. For ease of description, the part related to the embodiment of the present disclosure is shown, and specific details are not disclosed, which refer to the method part of the embodiments of the present disclosure. A terminal is taken as an example of the device. The terminal may be any terminal devices, such as, a mobile phone, a tablet personal computer, a PDA (Personal Digital Assistant), a POS (Point of Sales), an on-board computer. Below, a mobile phone is taken as an example of the terminal.

FIG. 8 is a block diagram of structures of a mobile phone related to a terminal according to an embodiment of the present disclosure. Reference is made to FIG. 8. The mobile phone includes a radio frequency (RF) circuit 810, a memory 820, an inputting unit 830, a display unit 840, a sensor 850, an audio circuit 860, a wireless fidelity (WiFi) module 870, a processor 880 and a power supply 890. It may be understood by those skilled in the art that, the structure of the mobile phone shown in FIG. 8 does not intend to limit the mobile phone, which may include more or less components as compared with the components illustrated in FIG. 8, or have some components combined, or use a different arrangement of the components.

Hereinafter various components of the mobile phone are described in detail in conjunction with FIG. 8.

The RF circuit 810 may be configured to receive and send information, or to receive and send signals in a call. Specifically, the RF circuit delivers the downlink information received from a base station to the processor 880 for processing, and transmits designed uplink data to the base station. Generally, the RF circuit 810 includes, but not limited to, an antenna, at least one amplifier, a transceiver, a coupler, a Low Noise Amplifier (LNA), and a duplexer. In addition, the RF circuit 810 may communicate with other devices and network via wireless communication. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, and Short Messaging Service (SMS).

The memory 820 may be configured to store software programs and modules, and the processor 880 may execute various function applications and data processing of the mobile phone by running the software programs and modules stored in the memory 820. The memory 820 may mainly include a program storage area and a data storage area. The program storage area may be used to store, for example, an operating system and an application required by at least one function (for example, a voice playing function, an image playing function). The data storage area may be used to store, for example, data established according to the use of the mobile phone (for example, audio data and telephone book). In addition, the memory 820 may include a high-speed random access memory and a nonvolatile memory, such as at least one magnetic disk memory, a flash memory, or other volatile solid-state memory.

The inputting unit 830 may be configured to receive input numeric or character information, and to generate a key signal input related to user setting and function control of the mobile phone. Specifically, the input unit 830 may include a touch control panel 831 and other input device 832. The touch control panel 831 is also referred to as a touch screen which may collect a touch operation thereon or thereby (for example, an operation on or around the touch control panel 831 that is made by a user with a finger, a touch pen and any other suitable object or accessory), and drive corresponding connection devices according to a pre-set procedure. Optionally, the touch control panel 831 may include a touch detection device and a touch controller. The touch detection device detects touch orientation of a user, detects a signal generated by the touch operation, and transmits the signal to the touch controller. The touch controller receives touch information from the touch detection device, converts the touch information into touch coordinates and transmits the touch coordinates to the processor 880. The touch controller also can receive a command from the processor 880 and execute the command. In addition, the touch control panel 831 may be implemented by, for example, a resistive panel, a capacitive panel, an infrared panel and a surface acoustic wave panel. In addition to the touch control panel 831, the input unit 830 may also include other input device 832. Specifically, the other input device 832 may include but not limited to one or more of a physical keyboard, a function key (such as a volume control button, a switch button), a trackball, a mouse and a joystick.

The display unit 840 may be configured to display information input by a user or information provided to the user and various menus of the mobile phone. The display unit 840 may include a display panel 841. Optionally, the display panel 841 may be formed in a form of a Liquid Crystal Display (LCD), an Organic Light-Emitting Diode (OLED) or the like. In addition, the display panel 841 may be covered by the touch control panel 831. When the touch control panel 831 detects a touch operation thereon or thereby, the touch control panel 831 transmits the touch operation to the processor 880 to determine the type of the touch event, and then the processor 880 provides a corresponding visual output on the display panel 841 according to the type of the touch event. Although the touch control panel 831 and the display panel 841 implement the input and output functions of the mobile phone as two separate components in FIG. 8, the touch control panel 831 and the display panel 841 may be integrated together to implement the input and output functions of the mobile phone in other embodiment.

The mobile phone may further include at least one sensor 850, such as an optical sensor, a motion sensor and other sensors. The optical sensor may include an ambient light sensor and a proximity sensor. The ambient light sensor may adjust the luminance of the display panel 841 according to the intensity of ambient light, and the proximity sensor may close the backlight or the display panel 841 when the mobile phone is approaching to the ear. As a kind of motion sensor, a gravity acceleration sensor may detect the magnitude of acceleration in multiple directions (usually three-axis directions) and detect the value and direction of the gravity when the sensor is in the stationary state. The acceleration sensor may be applied in, for example, an application of mobile phone pose recognition (for example, switching between landscape and portrait, a correlated game, magnetometer pose calibration), a function about vibration recognition (for example, a pedometer, knocking). Other sensors such as a gyroscope, a barometer, a hygrometer, a thermometer, an infrared sensor, which may be further provided in the mobile phone, are not described herein.

The audio circuit 860, a loudspeaker 861 and a microphone 862 may provide an audio interface between the user and the terminal. The audio circuit 860 may transmit an electric signal, converted from received audio data, to the loudspeaker 861, and a voice signal is converted from the electric signal and then outputted by the loudspeaker 861. The microphone 862 converts captured voice signal into an electric signal, the electric signal is received by the audio circuit 860 and converted into audio data. The audio data is outputted to the processor 880 for processing and then sent to another mobile phone via the RF circuit 810; or the audio data is outputted to the memory 820 for further processing.

WiFi is a short-range wireless transmission technique. The mobile phone may help the user to, for example, send and receive E-mail, browse a webpage and access a streaming media via the WiFi module 870, and provide wireless broadband Internet access for the user. Although the WiFi module 870 is shown in FIG. 8, it can be understood that the WiFi module 870 is not necessary for the mobile phone, and may be omitted as needed within the scope of the essence of the disclosure.

The processor 880 is a control center of the mobile phone, which connects various parts of the mobile phone by using various interfaces and wires, and implements various functions and data processing of the mobile phone by running or executing the software programs and/or modules stored in the memory 820 and invoking data stored in the memory 820, thereby monitoring the mobile phone as a whole. Optionally, the processor 880 may include one or more processing cores. In some embodiments, an application processor and a modem processor may be integrated into the processor 880. The application processor is mainly used to process, for example, an operating system, a user interface and an application. The modem processor is mainly used to process wireless communication. It can be understood that, the above modem processor may not be integrated into the processor 880.

The mobile phone also includes the power supply 890 (such as a battery) for powering various components. In some embodiments, the power supply may be logically connected with the processor 880 via a power management system. Therefore, functions such as charging, discharging and power management are implemented by the power management system.

Although not shown, the mobile phone may also include a camera, a Bluetooth module and so on, which are not described herein.

In the embodiment of the present disclosure, the processor 880 included in the terminal may further have the functions of the processor in the previous embodiment.

It should be noted that, various units included in the devices of the above embodiments are divided only according to logical functions, but not limited to the division, as long as it can implement corresponding functions. In addition, names of various functional units are only for ease of distinction, but not to limit the protection scope of the present disclosure.

It may be understood by those skilled in the art, all or part of steps implementing the above-described embodiments may be completed by hardware instructed by relevant program instructions, which can be stored in a computer readable storage medium. The above-mentioned storage medium may be a read-only memory, a disk or a CD etc.

The foregoing embodiments are only some embodiments of the present disclosure and are not meant to limit the protection scope of the present disclosure. All variations and substitutions made by those skilled in the art without departing from the technical scope according to the embodiments of the present disclosure shall fall in the protection scope of the present disclosure. Therefore, the protection scope of the present disclosure should be determined by the claims.

What is claimed is:

1. A method for realizing a verification code, comprising:
determining a language currently used by a user on a verification executer computing device;
selecting, from a plurality of available character verification code languages, a user language determined to being currently used by the user;
obtaining a character verification code comprising characters in the same language as the user language and displaying the character verification code for performing identity verification, wherein the character verification code comprises a first part comprising correct characters and a second part comprising an incorrect character based on a priori knowledge, wherein obtaining the character verification code comprises:
obtaining a sentence from a local text on a verification executer,
extracting randomly a character from the sentence, and
performing a random transformation on the extracted character to produce the incorrect character based on the a priori knowledge in the sentence to obtain the character verification code, and
wherein when the extracted character is in Chinese, the performing a random transformation on the extracted character to produce the incorrect character in the sentence to obtain the character verification code comprises:
determining synonym characters of the extracted character in a synonym character library, and
performing the random transformation on the extracted character by using a character other than the synonym characters of the extracted character to produce the incorrect character;
prompting inputting a correct character corresponding to the incorrect character in the character verification code, and receiving verification information; and
determining that the identity verification is successful in response to determining that the verification information corresponds to the correct character based on the a priori knowledge, and
determining that the identity verification fails in response to determining that the verification information does not correspond to the correct character based on the a priori knowledge.

2. The method according to claim 1, wherein obtaining the character verification code comprises:
receiving the character verification code from a service provider, wherein the character verification code comprises a sentence, and the sentence comprises the incorrect character based on the a priori knowledge.

3. The method according to claim 1, wherein when the character verification code comprises a sentence comprising a plurality of English words,
wherein each English word of the plurality of English words comprises a set of alphabetic letters, and
wherein the incorrect character is one English word in the character verification code generated by performing at least one of the following operations on one correct English word:
randomly exchanging orders of non-beginning and non-ending letters of the one correct English word in the character verification code; or
randomly adding a letter to the one correct English word.

4. The method according to claim 3, wherein both the one correct English word and the incorrect character are English words in correct spelling, the incorrect character has a different meaning compared with the one correct English word, such that the incorrect character with correct spelling is incorrect in a context of the sentence.

5. A device for realizing a verification code comprising:
a processor configured to:
determine a language currently used by a user on the device;
select, from a plurality of available character verification code languages, a user language determined to being currently used by the user;
obtain a character verification code comprising characters in the same language as the user language, wherein the character verification code comprises a first part comprising correct characters and a second part comprising an incorrect character based on a priori knowledge;
obtain a sentence from a local text;
extract randomly a character from the sentence and perform a random transformation on the extracted character to produce the incorrect character based on the a priori knowledge in the sentence to obtain the character verification code;
wherein when the extracted character is in Chinese, performing the random transformation on the extracted character to produce the incorrect character in the sentence to obtain the character verification code comprises:
determining synonym characters of the extracted character in a synonym character library, and
performing the random transformation on the extracted character by using a character other than the synonym characters of the extracted character to produce the incorrect character;
a display configured to display the character verification code for performing identity verification and prompt inputting a correct character corresponding to the incorrect character in the character verification code;
wherein the processor is further configured to:
receive verification information; and
determine that the identity verification is successful when the verification information corresponds to the correct character based on the a priori knowledge, and determine that the identity verification fails when the verification information does not correspond to the correct character based on the a priori knowledge.

6. The device according to claim 5, wherein the processor is further configured to receive the character verification code from a service provider, the character verification code comprises a sentence, and the sentence comprises the incorrect character based on the a priori knowledge.

7. The device according to claim 5, wherein when the character verification code comprises a sentence comprising a plurality of English words, each English word of the plurality of English words comprises a set of alphabetic letters, and the incorrect character is one English word in the character verification code;
wherein the processor is configured to perform at least one of the following operations on one correct English word to generate the incorrect character:
randomly exchanging orders of non-beginning and non-ending letters of the one correct English word in the character verification code, or
randomly adding a letter to the one correct English word.

8. The device according to claim 7, wherein both the one correct English word and the incorrect character are English words in correct spelling, the incorrect character has a different meaning compared with the one correct English word, such that the incorrect character with correct spelling is incorrect in a context of the sentence.

9. A verification method, comprising:
determining a language currently used by a user on a verification executer computing device;
selecting, from a plurality of available character verification code languages, a user language determined to being currently used by the user;
obtaining a character sequence comprising characters in the same language as used by the user language, wherein the character sequence comprises a first part and a second part;
generating a verification code based on the character sequence, wherein the generated verification code comprises a first part and a second part, the first part of the verification code comprises the same characters as the first part of the character sequence and the second part of the verification code is different from the second part of the character sequence, wherein generating the verification code comprises:
obtaining a sentence from a local text on a verification executer;
extracting randomly a character from the sentence, and performing a random transformation on the extracted character to produce an incorrect character based on a priori knowledge in the sentence,
wherein when the extracted character is in Chinese, the performing a random transformation on the extracted character to produce the incorrect character based on the a priori knowledge comprises:
determining synonym characters of the extracted character in a synonym character library, and
performing the random transformation on the extracted character by using a character other than the synonym characters of the extracted character to produce the incorrect character;
displaying the verification code;
receiving verification information inputted by the user corresponding to the second part of the verification code;
comparing the verification information inputted by the user with the second part of the character sequence; and
determining that a verification of the user is successful in response to determining that the verification information is consistent with the second part of the character sequence and determining that the verification of the user fails in response to determining that the verification information is not consistent with the second part of the character sequence.

10. The method according to claim 9, further comprising:
displaying prompt information to prompt the user to input the verification information.

11. The method according to claim 9, wherein the second part of the character sequence comprises a plurality of characters, and wherein generating the verification code based on the character sequence comprises:
changing the order of at least two of the plurality of characters to obtain the second part of the verification code.

12. The method according to claim 9, wherein the second part of the character sequence comprises a plurality of characters, and wherein generating the verification code based on the character sequence comprises:
deleting at least one of the plurality of characters to obtain the second part of the verification code.

13. The method according to claim 9, wherein the second part of the character sequence comprises one or more characters, and wherein generating the verification code based on the character sequence comprises:
substituting at least one of the one or more characters with a different character to obtain the second part of the verification code.

14. The method according to claim 9, wherein generating the verification code based on the character sequence comprises:
adding one or more characters to the second part of the character sequence to obtain the second part of the verification code.

15. The method according to claim 9, wherein the second part of the character sequence comprises a first English word, and the second part of the verification code comprises a second English word different from the first English word, and
wherein both the first English word and the second English word are English words in correct spelling, the second English word has a different meaning compared with the first English word, such that the second English word with correct spelling is incorrect in a context of the character sequence.

* * * * *